3,326,872
PRODUCTION OF PROPYLENE POLYMERS BY POLYMERIZATION OF PROPYLENE USING ZIEGLER CATALYSTS AND AS A MOLECULAR WEIGHT REGULATOR A HALOGEN CONTAINING ALKENE
Heinz Weber, Paul Schneider, and Siegfried Winderl, Ludwigshafen (Rhine), and Erich Flickinger, Frankweiler, Pfalz, Germany, assignors to Badische Anilin- & Soda-Fabrik Aktiengesellschaft, Ludwigshafen (Rhine), Germany
No Drawing. Filed Nov. 20, 1964, Ser. No. 412,855
Claims priority, application Germany, Nov. 28, 1963, B 74,434
2 Claims. (Cl. 260—88.2)

This invention relates to a process for polymerization of propylene using Ziegler catalysts and a regulator.

It is known that in the polymerization of propylene using Ziegler catalysts, i.e. catalysts composed of organometallic compounds or metal hydrides and compounds of the transition metals of groups IV to VI of the periodic system of elements, when using temperatures of from —20° to +160° C. and pressures of from atmospheric pressure to 25 atmospheres, very high molecular weight polymers are obtained having molecular weights of up to several millions. These polymers show high values for intrinsic viscosity. Special, relatively expensive methods have to be used for processing such polymers. It is therefore usual to add regulators in the polymerization of propylene. For example molecular hydrogen may be used as a regulator by adding it during the polymerization. Metering of the very small amounts of gaseous hydrogen which are commonly used offers difficulty and involves relatively large expenditure for apparatus. Moreover, in the continuous polymerization of propylene the unreacted propylene, which is recycled, becomes enriched with hydrogen, part of which must be separated.

In another prior art method, ethylenically unsaturated halogen compounds, such as allyl chloride, allyl bromide, allyl iodide, vinyl chloride and vinylidene chloride may be added for molecular weight regulation in the polymerization of monoolefins, such as propylene, in the presence of Ziegler catalysts. The regulating effect of these ethylenically unsaturated halogen compounds however leaves much to be desired.

It is furthermore known that carbon tetrachloride and chloroform may be used as regulators in the copolymerization of ethylene and propylene using Ziegler catalysts containing vanadium compounds. In this case, too, the regulating effect of these halogen compounds leaves much to be desired.

It is also known that alkyl tin compounds or alkyl aluminum hydrides may be added as regulators in the polymerization of propylene. While compounds of this type regulate well and do not decrease the yield of polymer, the polymers have a much lower proportion which is insoluble in boiling heptane.

It is the object of the present invention to provide an improved process for the production of propylene polymers having lowered intrinsic viscosity using Ziegler catalysts and regulators.

We have found that propylene polymers can be prepared particularly advantageously by homopolymerization or copolymerization of propylene using catalysts of organometallic compounds and metal hydrides and compounds of transition metals of groups IV to VI of the periodic system of elements at temperatures between —20° and +160° C. and pressures of from atmospheric pressure to 25 atmospheres in the presence of ethylenically unsaturated halogen compounds, by using as halogen compounds alkenes containing three or four carbon atoms and at least two chlorine and/or bromine atoms and having a terminal double bond, one of the halogen atoms being attached to the double bond and one in allyl position to the double bond.

Organometallic compounds or metal hydrides which are conventionally used in Ziegler catalysts, such as are described for example in British patent specifications Nos. 810,023 and 828,791, may be used in the process. Particular examples of these are: alkyl aluminum compounds, such as triethyl aluminum and triisobutyl aluminum, alkyl aluminum halides, such as ethyl aluminum dichloride, diethyl aluminum chloride, ethyl aluminum sesquichloride, methyl aluminum sesquichloride, diisopropyl aluminum chloride, diisopropyl aluminum bromide, diethyl aluminum hydride, sodium hydride, calcium hydride and lithium aluminum hydride. Examples of compounds of transition metals of groups IV to VI of the periodic system of elements which are suitable for the catalysts are the halogen and chelate complex compounds of titanium, zirconium, vanadium, chromium and molybdenum. Catalysts of ethyl aluminum compounds, such as triethyl aluminum, diethyl aluminum chloride and ethyl aluminum sesquichloride, and titanium or vanadium halides, particularly the complex compounds of titanium trichloride and aluminum chloride having the general formula $3TiCl_3 \cdot AlCl_3$, vanadium tetrachloride and vanadium oxychloride ($VOCl_3$), are preferred for the process.

In general at least 30% by weight of propylene (with reference to the total weight of monomers) should be polymerized in the process according to this invention. Ethylenically unsaturated hydrocarbons, such as monoolefins and diolefins, are suitable as monomers for the copolymerization. Examples of particularly suitable comonomers are ethylene, butene-1, dicyclopentadiene, cyclooctadiene-1,5, 3-methylheptadiene-1,5 and hexadiene-1,4. Mixtures of 30 to 70% by weight of propylene with ethylene and if desired 0.01 to 3% by weight of a diolefin of the said type are of particular importance for the copolymerization.

Temperature and pressure conditions for the process may be chosen within the usual range of from —20° to +160° C. and from atmospheric pressure to 25 atmospheres. Temperatures of from room temperature to 150° C. and pressures of from 5 to 10 atmospheres are preferred for the homopolymerization of propylene. Temperatures of from —10° to +80° C. and pressures of from 3 to 10 atmospheres have proved to be particularly suitable in the copolymerization of propylene. Polymerization may be carried out continuously or batchwise in the pressence or absence of indifferent diluents. Examples of liquid diluents are liquid alkanes, cycloalkanes, aromatic hydrocarbons, halohydrocarbons and liquid propylene. For example heptane, cyclohexane, trichloroethylene, toluene and gasoline fractions having boiling points of from about 40° to 200° C. are suitable.

The halogen compounds which are used as regulators according to this invention exhibit a particularly marked effect in regulating molecular weight in the polymerization of propylene. The amounts used in the process may vary within wide limits. An amount of from 0.001 to 10 moles of ethylenically unsaturated halogen compound per mole of transition metal compound has proved to be particularly advantageous in the process and those halogen compounds in which the halogen atom combined at the double bond is not attached to the terminal carbon atoms of the double bond are preferred. Examples of suitable halogen compounds are: 2,3-dichloropropene-1, 1,2,3-trichloropropene, 2-chloro-3,4-dibromobutene-1 and 1,2,3-trichlorobutene-1,2,3-dichloropropene-1 is preferred owing to its outstanding regulating action.

In the process according to this invention, the ethylenically unsaturated halogen compounds may be added to the polymerization mixture as such or in dissolved or suspended form, if desired together with the catalysts or together with one of the catalyst components or together with liquid monomers. When the process is carried out batchwise, it is of particular advantage to supply the ethylenically unsaturated chlorine and/or bromine compound to the polymerization mixture gradually in small amounts or continuously, spread over the period provided for the polymerization. A particularly marked regulating effect can be achieved in this way.

A particular advantage of the process according to this invention may be seen in the fact that molecular weight can be regulated in the polymerization of propylene without the yield of polymer being appreciably impaired in the way it generally is when prior art regulators are used. Surprisingly a greatly increased yield of polymer is usually obtained by the new process particularly when propylene is polymerized in admixture with ethylene and if desired diolefins in the presence of catalysts composed of compounds containing vanadium. The stereospecificity of the catalysts is only slightly decreased by the new process. If desired, the conventional cocatalysts for increasing stereospecificity of the catalysts may be coemployed in the process. Examples of suitable cocatalysts are triphenyl phosphine oxide and triphenylbutyl phosphonium bromide.

The invention is illustrated by the following examples in which parts are parts by weight.

*Example 1*

Propylene is polymerized for three hours at 55° C. at a pressure of 1 atmosphere while stirring in an autoclave which contains a suspension of 1.8 parts of the titanium trichloride complex $3TiCl_3 \cdot AlCl_3$ and 2.3 parts of diethyl aluminum chloride in 660 parts of gasoline having the boiling point range of 80° to 110° C. A solution of 0.11 part of 2,3-dichloropropene-1 in 100 parts of gasoline is dripped in continuously during the said period. When the polymerization is over, the product is worked up in the usual way. 43 parts of polypropylene is obtained having an intrinsic viscosity $[\eta]=2.8$. The proportion insoluble in boiling heptane is 93% by weight.

For comparison, propylene is polymerized with an addition of equimolar amounts of prior art regulators and without any regulator under otherwise identical conditions. The results obtained are shown in the following table:

TABLE

| Addition | | Polypropylene obtained | | |
|---|---|---|---|---|
| Parts | Regulator | Yield in parts | $[\eta]$ | Proportion insoluble in heptane in percent by weight |
| | | 49 | 5.8 | 95 |
| 0.63 | Vinyl chloride | 48 | 5.3 | 95 |
| 0.08 | Allyl chloride | 41 | 4.8 | 92 |
| 0.12 | Chloroform | 44 | 4.4 | 93 |
| 0.15 | Carbon tetrachloride | 34 | 4.4 | 95 |
| 0.09 | 2-chlorobutadiene | 47 | 5.5 | 95 |

*Example 2*

Polymerization is carried out in the way described in Example 1, but 0.0011 part of 2,3-dichloropropene-1, instead of 0.11 part, is dripped in continuously as a solution in 110 parts of gasoline having a boiling point range of 80° to 110° C. during the polymerization. 60 parts of polypropylene is obtained having an intrinsic viscosity of $[\eta]=4.4$. The proportion which is insoluble in boiling heptane is 90.2% by weight.

By using ten times the molar amount, i.e. 0.012 part of chloroform or 0.015 part of carbon tetrachloride, instead of the 2,3-dichloropropene-1, 55 or 54 parts of polypropylene having an intrinsic viscosity of $[\eta]=6.1$ or 6.2 is obtained under otherwise the same conditions; the proportion insoluble in boiling heptane is 94.7% or 94.3% by weight.

*Example 3*

Polymerization is carried out as described in Example 1 but the solution of 2,3-dichloropropene-1 is added all at once at the commencement of the polymerization. 30 parts of polypropylene is obtained having an intrinsic viscosity of $[\eta]=4.1$ and a proportion of 92% by weight which is insoluble in boiling heptane.

If the solution of 2,3-dichloropropene-1 is not added all at once but in batches at intervals of twenty-five minutes, a solution of 0.22 part of 2,3-dichloropropene-1 in 22 parts of gasoline being used each time and being allowed to flow in in each case during the course of five minutes, and the polymerization is otherwise carried out in the same way, 38 parts of polypropylene is obtained which has an intrinsic viscosity of $[\eta]=3.1$ and which has a proportion of 93.6% by weight which is insoluble in boiling heptane.

*Example 4*

Polymerization is carried out as described in Example 1 but a solution of 0.25 part of 1,2-dibromo-3-chlorobutene-1 in 110 parts of gasoline having a boiling point range of 80° to 110° C. is used instead of the 2,3-dichloropropene-1 solution. 35 parts of polypropylene is obtained which has an intrinsic viscosity of $[\eta]=3.9$ and a proportion of 92.5% by weight which is insoluble in boiling heptane.

*Example 5*

Polymerization is carried out as described in Example 1 but, instead of the 2,3-dichloropropene-1 solution, a solution of 0.15 part of 1,2,3-trichloropropene-1 in 110 parts of gasoline having a boiling point range of 80° to 110° C. is added in each case at intervals of twenty-five minutes. After a total polymerization period of three hours, 37 parts of polypropylene is obtained which has an intrinsic viscosity of $[\eta]=3.6$ and which has a proportion of 93.8% by weight which is insoluble in boiling heptane.

*Example 6*

100 parts per hour of a mixture of 3 parts by volume of propylene and 2 parts by volume of ethylene is passed for three hours at 55° C. at atmospheric pressure into a suspension of 1.73 parts of vanadium oxychloride and 2.3 parts of diethyl aluminum chloride in 1,000 parts of gasoline having a boiling point range of 80° to 110° C. During this period, a solution of 2.2 parts of 2,3-dichloropropene-1 in 100 parts of gasoline is allowed to drip in continuously. The product is worked up as usual and 122 parts of an amorphous copolymer is obtained which has an intrinsic viscosity of $[\eta]=2.5$.

If a solution of 8.3 parts of 2,3-dichloropropene-1 in 100 parts of gasoline be used instead of a solution of 2.2 parts of 2,3-dichloropropene-1, 162 parts of an amorphous copolymer is obtained under otherwise the same conditions; the intrinsic viscosity of the copolymer is $[\eta]=0.65$.

For comparison, a solution of 3.1 parts of carbon tetrachloride or of 2.1 parts of 2-methyl-4-chlorobutene-2, each in 100 parts of gasoline, is used instead of the 2,3-dichloropropene-1 solution. By otherwise identical polymerization, only 104 or 108 parts of amorphous propylene-ethylene copolymer is obtained having an intrinsic viscosity $[\eta]=3.5$ or 4.

*Example 7*

100 parts per hour of a mixture of 3 parts by volume of propylene and 2 parts by volume of ethylene is led at 20° to 35° C. and atmosphere pressure for one hour into a suspension of 2.48 parts of methyl aluminum sesquichloride and 1.73 parts by weight of vanadium oxychloride while stirring. After a polymerization period of two minutes, 6.6 parts of dicyclopentadiene is added to the polymerization mixture. Also a solution of 2.2 parts of 2,3- dichloropropene-1 in 100 parts of cyclohexane is dripped in continuously during the polymerization. The product is worked up in the usual way and 44 parts of an amorphous terpolymer is obtained which has an intrinsic viscosity $[\eta]=1.8$.

By polymerizing in the same way but without adding any 2,3-dichloropropene-1 solution, 43 parts of a terpolymer is obtained which has an intrinsic viscosity $[\eta]=3.2$.

Example 8

100 parts of a mixture of 3 parts by volume of propylene and 2 parts by volume of ethylene is passed for one hour at a temperature of −5° to −10° C. while stirring into a suspension of 2.48 parts of methyl aluminum sesquichloride and 1.73 parts of vanadium oxychloride in 1,000 parts of gasoline having the boiling point range 80° to 110° C. A solution of 0.11 part of 2,3-dichloropropene-1 in 100 parts of gasoline is dripped in continuously during the polymerization. 133 parts of a copolymer of propylene and ethylene is obtained which has an intrinsic viscosity $[\eta]=1.9$.

By polymerizing without an addition of dichloropropene, only 97 parts of copolymer having an intrinsic viscosity $[\eta]=2.9$ is obtained under otherwise identical conditions.

Example 9

100 parts per hour of a mixture of 3 parts by volume of propylene and 2 parts by volume of ethylene is passed for three hours under atmosphere pressure at a temperature of 55° C. while stirring into a suspension of 1.73 parts of vanadium oxychloride and 2.3 parts of diethyl aluminum chloride in a mixture of 530 parts of gasoline having a boiling point range of 80° to 110° C. and 1,100 parts of trichloroethylene. A solution of 2.2 parts of 2,3-dichloropropene-1 in 160 parts of the solvent mixture is supplied continuously during the polymerization. The whole is worked up as usual and 143 parts of a copolymer of propylene and ethylene is obtained which has an intrinsic viscosity $[\eta]=0.17$.

Without adding dichloropropene, 122 parts of a copolymer of propylene and ethylene is obtained which has an intrinsic viscosity $[\eta]=2.3$.

Example 10

A mixture of 1.66 parts by volume of propylene and 1 part by volume of ethylene is polymerized for one hour at 65° C. under a pressure of 6 atmospheres gauge in an autoclave containing a mixture of 180 parts of gasoline having a boiling point range of 80° to 110° C., 0.2 part of diethyl aluminum chloride and 0.13 part of vanadium oxychloride, 0.22 part of 2,3-dichloropropene-1 is added continuously during the polymerization. After the usual processing, 7.3 parts of a copolymer is obtained which has an intrinsic viscosity $[\eta]=3.3$.

Under otherwise identical conditions but without the addition of dichloropropene, only 4.4 parts of copolymer is obtained having an intrinsic viscosity of $[\eta]=5.3$.

Example 11

Propylene is polymerized for twelve hours at 70° C. under a pressure of 10 atmospheres gauge in an autoclave which contains a mixture of 1,000 parts of gasoline having the boiling range 80° to 110° C., 0.75 part of diethyl aluminum chloride, 0.5 part of the complex compound $3TiCl_3 \cdot AlCl_3$ and 0.11 part of 2,3-dichloropropene-1. After conventional working up, 520 parts of polypropylene is obtained having the intrinsic viscosity $[\eta]=5.9$. The polypropylene contains 88% by weight of constituents insoluble in boiling heptane.

By carrying out the polymerization under the same conditions but using equimolar amount of chloroform instead of the dichloropropene, only 280 parts of polypropylene is obtained having the intrinsic viscosity $[\eta]=2$. In this case the polypropylene has a proportion of only 72% which is insoluble in boiling heptane.

Example 12

Propylene is polymerized for three hours at 55° C. under a pressure of 1 atmosphere in an autoclave which contains a suspension of 0.5 part of the titanium trichloride complex $3TiCl_3 \cdot AlCl_3$ and 1.2 parts of triisobutyl aluminum in 660 parts of gasoline having a boiling point range of 80° to 110° C. A solution of 0.11 part of 2,3-dichloropropene-1 in 110 parts of gasoline is continuously supplied during the polymerization. When the polymerization is over, the product is worked up as usual. 138 parts of polypropylene is obtained having an intrinsic viscosity $[\eta]=3.4$; the proportion which is insoluble in boiling heptane is 56% by weight.

For comparison, propylene is polymerized without the addition of 2,3-dichloropropene-1 solution under otherwise identical conditions. 145 parts of polypropylene is obtained having an intrinsic viscosity $[\eta]=4.5$; the proportion which is insoluble in boiling heptane is 55% by weight.

Example 13

Propylene is polymerized for three hours at 70° C. under a pressure of 10 atmospheres gauge in an autoclave which contains a mixture of 350 parts of gasoline having a boiling point range of 80° to 110° C., 1.22 parts of butyl lithium, 0.11 part of 2,3-dichloropropene-1 and 1.8 parts of the titanium trichloride complex $3TiCl_3 \cdot AlCl_3$. After the usual working up, 48 parts of polypropylene is obtained having the intrinsic viscosity $[\eta]=7.8$; the proportion insoluble in boiling heptane is 78% by weight.

Example 14

A suspension of 1.7 parts of lithium aluminum hydride in a mixture of 350 parts of gasoline having a boiling point range of 80° to 110° C. and 0.11 part of 2,3-dichloropropene-1 in an autoclave is treated with propylene for one hour at 50° C. The whole is cooled to room temperature, released from pressure, 1.8 parts of the titanium trichloride complex $3TiCl_3 \cdot AlCl_3$ is added and polymerization is carried on for three hours at 70° C. at a pressure of 10 atmospheres gauge. 160 parts of polypropylene is obtained which has an intrinsic viscosity $[\eta]=2.1$ and which has a proportion of 73% which is insoluble in xylene.

If polymerization be carried out without adding 2,3-dichloropropene-1 under otherwise the same conditions, 188 parts of polypropylene is obtained which has the intrinsic viscosity $[\eta]=2.4$ and which has a proportion of 78% which is insoluble in xylene.

Example 15

A mixture of 19 parts by volume of propylene and 1 part by volume of butene-1 is polymerized for three hours at a pressure of 1 atmosphere and at 55° C. in an autoclave which contains a suspension of 1.8 parts of the titanium chloride complex $3TiCl_3 \cdot AlCl_3$ and 2.3 parts of diethyl aluminum chloride in 660 parts of gasoline having a boiling point range of 80° C. to 110°. A solution of 0.11 part of 2,3-dichloropropene-1 in 110 parts of gasoline having the boiling point range of 80° to 110° C. is added continuously during the polymerization. 58 parts of polymer is obtained which has an intrinsic viscosity $[\eta]=3.2$ and which has a proportion of 84% by weight which is insoluble in boiling heptane.

For comparison the polymerization is carried out under the same conditions but without adding 2,3-dichloropropene-1. 66 parts of polypropylene is obtained which has the intrinsic viscosity $[\eta]=4.3$ and which has a proportion of 87% by weight which is insoluble in boiling heptane.

Example 16

Polymerization is carried out as described in Example 15 but using 1.7 parts of vanadium oxychloride and 2.3 parts of diethyl aluminum chloride as catalyst and introducing a solution of 0.11 part of 2,3-dichloropropene-1.

18 parts of an amorphous copolymer is obtained having the intrinsic viscosity $[\eta]=0.6$.

For comparison, polymerization is carried out under the same conditions but without adding 2,3-dichloropropene-1. 21 parts of amorphous copolymer is obtained having an intrinsic viscosity $[\eta]=1.1$.

We claim:

1. In a process for the production of propylene polymers by polymerization of propylene in the presence of a Ziegler catalyst at a temperature of between $-20°$ and $+160°$ C. and a pressure of between atmospheric pressure and 25 atmospheres in the presence of a polymerization regulator, the improvement which comprises: using as said polymerization regulator an alkene containing 3 to 4 carbon atoms, one terminal double bond and at least 2 halogen atoms selected from the group consisting of chlorine and bromine, one of said halogen atoms being attached to a carbon atom of said double bond and one being attached in 3-position to the alkene molecule, the amount of said polymerization regulator used in the process being from 0.001 to 10 mols per mol of the transitional metal compound of said Ziegler catalyst.

2. A process as in claim 1 wherein at least 30% by weight of propylene with reference to the total weight of the monomers is used in preparing said propylene polymers.

References Cited

UNITED STATES PATENTS

| | | | |
|---|---|---|---|
| 3,029,231 | 4/1962 | Jan Van Amerongen | 260—93.7 |
| 3,101,327 | 8/1963 | Lyons | 260—88.2 |

JOSEPH L. SCHOFER, *Primary Examiner.*

M. B. KURTZMAN, *Assistant Examiner.*